Figure 1:
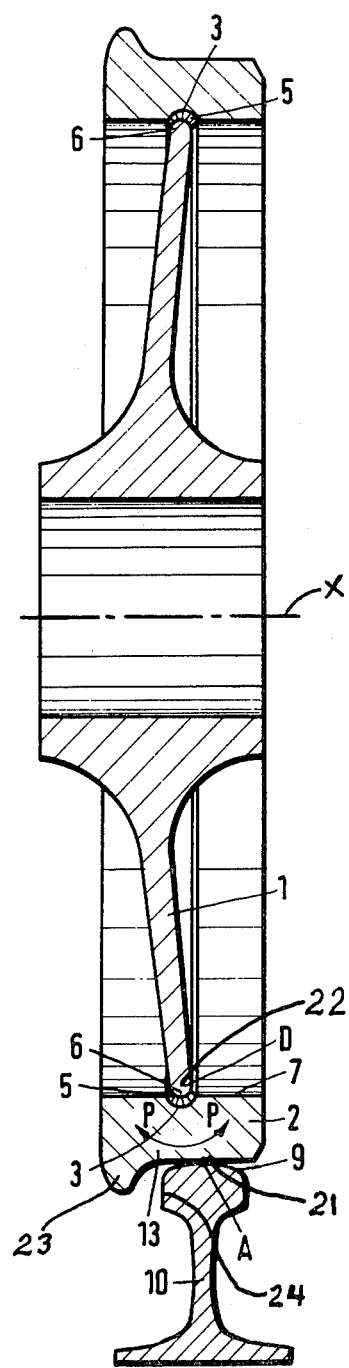

United States Patent [19]

Brauer

[11] 4,420,179

[45] * Dec. 13, 1983

[54] RAILWAY CAR WHEEL

[75] Inventor: Hans-Martin Brauer, Mögglingen, Fed. Rep. of Germany

[73] Assignee: Schwäbische Hüttenwerke Gesellschaft mit beschränkter Haftung, Aalen-Wasseralfingen, Fed. Rep. of Germany

[*] Notice: The portion of the term of this patent subsequent to Mar. 9, 1999 has been disclaimed.

[21] Appl. No.: 291,103

[22] Filed: Aug. 7, 1981

Related U.S. Application Data

[63] Continuation-in-part of Ser. No. 950,591, Oct. 12, 1978, Pat. No. 4,318,564.

[30] Foreign Application Priority Data

Oct. 15, 1977 [DE] Fed. Rep. of Germany ....... 2746407

[51] Int. Cl.³ .......................... B60B 3/04; B60B 9/12; B60B 17/00; B60B 21/00
[52] U.S. Cl. ...................................... 295/15; 74/443; 295/3; 295/11; 295/21; 295/44
[58] Field of Search ................. 295/1, 7, 9, 11, 12, 295/13, 14, 15, 21, 30, 34, 43, 44, 3, 24

[56] References Cited

U.S. PATENT DOCUMENTS

| 180,247 | 7/1876 | Levake | 295/10 X |
| 925,398 | 6/1909 | Toombs, Jr. | 295/10 |
| 990,038 | 4/1911 | Eustis | 295/10 |
| 1,982,043 | 11/1934 | Brownyer | 295/11 |
| 2,113,379 | 4/1938 | Maas | 295/11 |
| 3,127,211 | 3/1964 | Kordes et al. | 295/11 |
| 3,756,646 | 9/1973 | Gimlett et al. | 295/7 X |
| 3,915,490 | 10/1975 | Ranger et al. | 295/21 |
| 3,988,992 | 11/1976 | Schindehütte | 295/7 X |
| 4,318,564 | 3/1982 | Brauer | 295/7 X |

FOREIGN PATENT DOCUMENTS 564514 11/1932 Fed. Rep. of Germany ........ 295/14

Primary Examiner—Robert B. Reeves
Assistant Examiner—Howard Beltran
Attorney, Agent, or Firm—Becker & Becker, Inc.

[57] ABSTRACT

A wheel for rail vehicles with at least one disc which is connected to an axle, and with a wheel rim having a tread or surface surrounding the disc, while the rail tread in engagement with the rim tread results in contacting points of the wheel during straight forward drive of the vehicle located on the tread or track of the rails. At least within that region of the rim which contains the above mentioned rail contacting points of the wheel rim the wheel rim is turnably connected to the disc for turning about an imaginary axis located in about the driving direction of the wheel.

5 Claims, 3 Drawing Figures

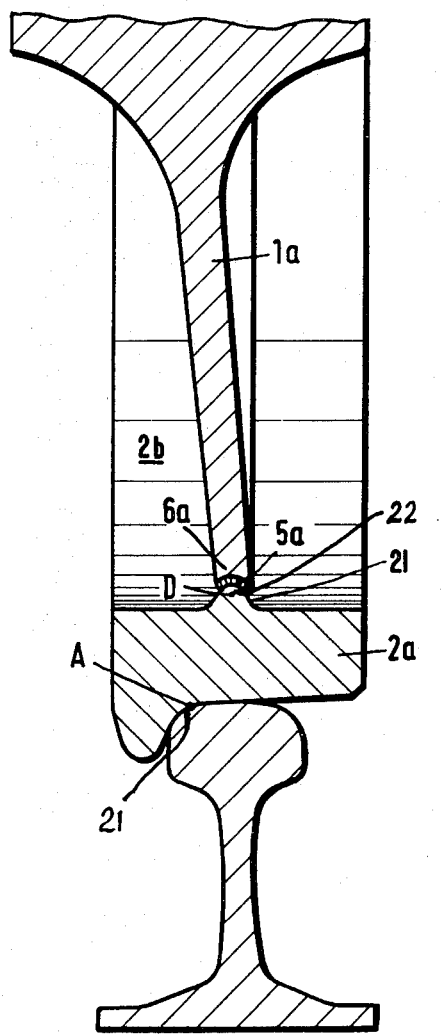
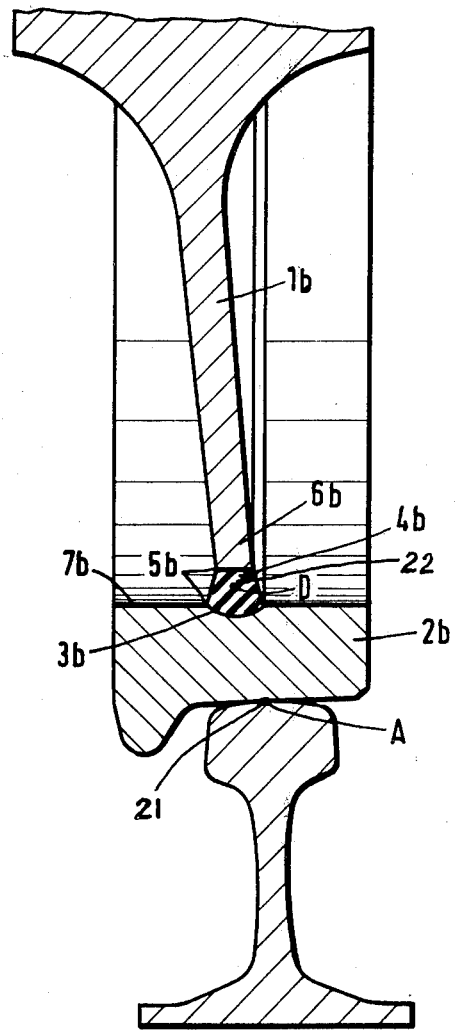

RAILWAY CAR WHEEL

This is a continuation-in-part application of originally copending parent application Ser. No. 950,951-Brauer filed Oct. 12, 1978, U.S. Pat. No. 4,318,564-Brauer issued Mar. 9, 1982.

The present invention relates to a wheel for rail vehicles with at least one disc connected to an axle, and with a wheel rim surrounding said disc. Heretofore known wheels of the above mentioned type consist of a metallic material and are rigidly designed. Their wheel discs and their rim are connected to a shaft of a wheel set in a torsion-resistant manner. As a result thereof, the right hand and left hand wheel disc during the running of the wheel will turn at the same angular speed whereby the driving behavior of a rail vehicle equipped with wheels of the above mentioned type is effected. The driving behavior of such equipped vehicle is furthermore dependent among other things on the design of the wheel rim profile. Rims with a cylindrical running surface due to a rolling radius of the same magnitude will bring about a unilateral engagement of the wheel flange or rim and in view of the unsatisfactory wearing behavior have not been adopted in practice. Conical profiles with relatively slight or weak inclination or slope (for instance the known profile 1:20/1:40) will in conformity with the respectively effective rolling radius bring about a periodical turning movement of the wheel set in the track passage which turning movement is designed as sine movement. When these profiles are new and not worn, they will even at higher speeds of up to 200 km/h and therebeyond have a stable running behavior. However, they are expensive as to servicing because after only a relatively short period of operation they are greatly worn.

Surfaces adapted to encounter wear or wearing profiles for instance the known profiles of German railway and other European rail systems, wear substantially uniformly over their entire contact zone with the rail. The contour of a new and of a worn profile are of such a shape that when placed one upon the other they nearly cover each other. These surfaces or profiles adapted to encounter wear do not require the customary so-called profile correction customary with other profiles, according to which after a relatively short running period the original condition of the profile has to be restored by a chip removing operation. Therefore, these other profiles are not economical for the maintenance of rail vehicles.

The dynamic behavior of wheel sets with surfacing or profile adapted to encounter wear is nearly independent of the running period and is satisfactory within the speed range below about 160 km/h. At high speeds, however, considerable drawbacks are encountered. With increasing speed, the turning movement of the wheel set in the track passage is accelerated in view of quickly increasing differences of the effective rolling diameter as it is characteristic for anti-wear profiles. In other words, the sine curve is in view of shorter turning intervals reduced so that the wheel set and the entire bogie will carry out uncontrolled movements in the track passage. The wheel set may in this connection be subjected to such high forces that maintaining the gauge or staying in the track of the vehicle may be impossible with the result that the track may be damaged.

In an endeavor to counteract these uncontrolled movements of the wheel set, it has been suggested between the bogie and the vehicle box to insert mechanical or hydraulic devices which will interfere with such turning movements, in other words turning or stabilizing devices. These devices for interfering with the turning movements will prevent fast movements of the bogie about its turning pivot, however they interfere with the driving comfort of the passengers in such rail vehicle, inasmuch as they convey relatively strong oscillations and noises into the passenger compartment.

Furthermore, wheels have become known which for purposes of reducing radial shocks, have a certain elasticity between the wheel and the rail. This elasticity is obtained by a resilient arrangment of the discs. These discs may consist for instance of metallic and elastic material such as rubber, or may have a special shape. For purposes of avoiding changes in the guage of the wheel set, these wheels are stiff in axial direction.

All features provided with regard to the development of wheel rim profiles in conformity with the preceding clearly are based on the endeavor to maintain the contact geometry precisely defined and to establish the oscillating conditions between wheel profile and rail profile so as to be able to reproduce these conditions.

Surprisingly, it has been found that the running behavior of railroad wheel sets with anti-wear profile can be greatly improved in contrast to heretofore known findings, when the wheel rim is enabled relative to the wheel disc and thus also relative to the rail, to carry out rotary movements about an imaginary axis parallel to the rails; a tilt or rotary movement arises only in a direct contact region with the rail. A tilt or pivot axis consequently can be imagined only for this part of the wheel rim; only the region of the wheel rim adjoining the contact region with the rail tilts or pivots about the axis.

It is, therefore, an object of the present invention to so design rail vehicle wheels with surfacing or profile adapted to encounter wear that the cost for the devices which are intended in the track passage to prevent an unstable movement will not be encountered at present traveling speeds up to 200 km/h, whereas at higher speeds such unstable running will be reduced.

These and other objects and advantages of the invention will appear more clearly from the following specification in connection with the accompanying drawing, in which:

FIG. 1 illustrates a radial section through a wheel according to the invention which is supported by a rail.

FIGS. 2 and 3 respectively illustrate further embodiment of a wheel according to the invention in an illustration similar to that of FIG. 1, but on a larger scale than that of FIG. 1.

The device according to the present invention is characterized primarily in that the rim at least in the region of its rail contacting point is rotatable on the disc about an axis located substantially in the driving direction.

Referring now to the drawings in detail and FIG. 1 thereof in particular, FIG. 1 illustrates a wheel which comprises a convex, rigid, metal wheel disc 1 and a rim or tire 2 including a tread 2a or surface which surrounds disc 1 and is provided with an anti-wear profile. The disc and the rims are pivotally connected to each other. The disc has a convex end 6 which forms the ball element of the ball joint connection. By means of the end 6, the disc rests in a trough-shaped depression 3 on the inside 7 of the rim in a positive manner, which depression forms the socket for the ball element or a convex bearing surface. Between the end 6 of disc 1 and the depression 3 there is provided a layer 5 which, for absorbing radial shocks and for purposes of avoiding noise due to the friction of the parts of the joint relative to each other and also for avoiding fretting corrosion, may consist of a metallic material and/or a lubricant. As metallic material may be used sprayed-on metal powder or sinter bronze. As an example for a lubricant in this connection may be mentioned molybdenum disulfide, tetrafluoroethylene, or graphite. This layer additionally prevents the wear to which the parts of the joint are exposed in view of a movement relative to each other. The layer 5 may be fixedly connected to the disc or to the rim, e.g. by bonding, welding, or soldering.

Considering the rim or tire 2 in detail, the tire has an interior surface $2b$ which has in FIG. 1 a portion of greater diameter $2b'$ and a portion of lesser diameter $2b''$. The concave bearing surface 3 is formed on the portion of greater diameter $2b''$. The tread surface $2a$ forms a section of a cone and converges toward a first radial surface $2c$ of the tire 2 from the wheel flange 23. The wheel flange 23 is formed at the juncture of the tread surface $2a$ and a second radial surface $2d$.

Considering the wheel disc 3 in more detail, the wheel disc includes a web $3a$ and a hub $3b$. The web $3a$ is substantially thinner than the hub $3b$ and is concave with respect to the first surface $2c$ of the tire 2. The periphery of the web on which the convex end 6 is formed is curved about an imaginary circumferential line about the disc, such as a line which is normal to the axis X and passes through point 22.

If now, during the running operation of the wheel, the resultant of the momentary values of horizontal and vertical forces will not at the same time pass through the turning point D within the region of the free end 6 of disc 1 and through the momentary rail contacting point A lying in a tread periphery or surface of the rim 2 on the tread or track 9 of a rail 10 of FIG. 1 also showing a wheel axis X, then rim 2 is able, within a region 13 adjacent to the rail contacting point A of interengagement between the wheel tread or surface of rim 2 and the running surface or rail tread on rail 10, to turn in the direction of the arrow P about the axis 22 of the wheel or disc which axis 22 is located in the driving direction of the pertaining vehicle and comprises the pivot point D of disc 1. At the same time, the rim 2 turns about an axis 21 which passes through the rail contacting point A and extends parallel to the axis through the pivot point D.

The embodiment of FIG. 2 substantially corresponds to the embodiment of FIG. 1 with the difference that the joint is formed by a concave end $6a$ of disc $1a$ which forms the socket of the joint and is furthermore formed by a pertaining projection 21 of the rim $2a$ which projection $3a$ forms the pertaining ball of the ball joint and has a lesser diameter than the rest of the inner surface $2b$. The parts of the ball joint likewise engage each other under or through the interposition of a dampening and/or lubricating layer $5a$.

With the wheel according to FIG. 3, the pivotal connection between the disc $1b$ and the rim $2b$ is formed by a member $4b$ of elastic material as for instance rubber or high molecular polyethylene. The member $4b$ is located in a concavity depression $3b$ on the inside $7b$ of the rim and a correspondingly designed convex free end $6b$ of the disc $1b$ while therebetween a dampening and/or lubricating layer $5b$ is interposed. The layers $5b$ may be connected between the disc and the member $4b$ or between the member $4b$ and the rim and to the oppositely located outer surface of the member $4b$, so that the member $4b$ will form a bearing part for the ball of the ball joint.

The following paragraphs set forth the problematic situation and technical position involved with the present invention. It is correct that the wheel base or track gauge which means the spacing of the inner located side surfaces 24 of both rails 10 of a rail is greater than the track measurement or width between rails (track gauge) which means the spacing of the rim or flange flanks extending outwardly for both rail discs belonging to a wheel set. The difference between the track gauge or width and the track measurement is the track play which means the amount of transverse movement that a wheel set can carry out in a rail until a positive connection results between the track rim or flange flank and the rail side flange. This axial capability of movement of the wheel set in the rail with new condition of the rails and the wheel set is nominal and with increasing duration of use is greater as a consequence of the material removal and wearing away along the engagement zones both for the rails and also for the tires or wheel rim.

The manner of transverse movement of the wheel set in the rail is dependent upon many parameters, for instance, running mechanism arrangement, axial spring and damping characteristics of the wheel set coupling engagement, adhering or binding value of wheel/rail, track widths or gauge, rail inclination and the like.

This continuous axial back and forth swinging or oscillation of the wheel set in the rail is designated as "sinusoidal running" or harmonic motion.

According to FIG. 1, the flange 23 can define or occupy a spacing "x" relative to the engagement surface 24. Because of this axial play between the guide bead 23 or flange 23 and the corresponding side surface 24 of the rail 10 there is noted that the wheel set is axially movable with its wheels between the side surfaces 24 of two rails 10 as to the track path or passage.

A wheel set moves axially back and forth because of predetermined geometry of the tire or rim even during straight ahead running or movement whereby the reversal of direction (turning movement of the wheel set) is introduced or brought about at a time by way of engagement or bumping against the corresponding flange 23 against the side surface 24 of the rail 10 belonging therewith. This axial to and fro movement is designated by experts or those skilled of the art of railways as "sinusoidal running" of the wheel set as mentioned previously.

At high speeds of above 160 km/h, this back and forth movement of the wheel set is so strong that the flange 21 engages with such an impact against the side surface 24 of the rail 10 that the wheel can jump out of the rail and the train derails.

According to the present invention, an embodiment or arrangement is provided between the wheel disc and wheel tire or rim which makes possible a tilting or pivoting of the wheel tire or rim about an axis or pivot 22 or 23 spaced above and offset relative to the rail and forming a sequence or series of pivot points collectively in a linear direction parallel to the rail line or track 10.

The axes 21 respectively 22 project into the plane of the drawing illustrations. The basic concept of the present invention is namely to protect the tilt or pivot movement of the wheel tire or rim relative to the wheel disc as extensively as possible. As an essential features of the present invention, there is to be established that the wheel disc and the wheel tire or rim are fastened or secured torsionally stiff upon a wheel set shaft defining an axis X.

As will be evident from the above, due to the design according to the invention, the rim can always turn or carry out an oscillation or pendulum movement when the resultant of the momentary values of the horizontal and vertical forces do not simultaneously pass through the pivot point of the rim and the momentary rail contacting point of the rim on the track. Within low speed ranges below the limit speed, there occurs a damping effect which is considerable in comparison to rigid wheels, and at speeds which are higher than the limit speeds, the self excitement of the oscillating system is considerably less than with a rigid wheel.

In order at high driving speed to assure running safety, it is not necessary with the design according to the invention to provide expensive and great structural changes on the vehicle or the damping and turning interfering devices between the vehicle box and the bogie.

It is, of course, to be understood that the present invention is, by no means, limited to the specific showing in the drawings, but also comprises any modification within the scope of the appended claims.

What I claim is:

1. A wheel used in a wheel set mounted on an axle for use with vehicles which ride on pairs of rails, the wheel comprising:

a wheel disc having an annular web portion and hub portion integral with the web portion, wherein the hub portion is centrally disposed in the wheel disc for concentric attachment of the wheel disc to the axle and wherein the web portion has an outer periphery which is curved about a line circumferential with respect to the disc, the web portion being concave and substantially thinner in cross-section than the hub portion;

a metal tire surrounding the wheel disc, the metal tire having a circular tread surface for engaging the rail, a circular interior surface for juxtaposition with the wheel disc, a first radial surface and a second radial surface, wherein the exterior surface joins the second radial surface to form a large diameter wheel flange and converges toward the first radial surface, and wherein the interior surface has portions of lesser diameter and greater diameter, one of which is curved to form a bearing surface which complements the curved bearing surface on web portion of the wheel disc and;

a bearing material on one of the bearing surfaces, whereby as the vehicle rolls along the rails and the wheel moves axially to engage and disengage the wheel flange with the rail, the tire oscillates with respect to the wheel disc about an axis extending normally with respect to the rail and hub.

2. The wheel of claim 1 where the bearing surface on the interior surface of the tire is formed on the greater diameter portion and is concave while the bearing surface on the outer periphery of the flange portion is convex.

3. The wheel of claim 1 wherein the bearing surface on the interior surface of the tire is formed on the lesser diameter portion and is convex while the bearing surface on the flange portion is concave.

4. The wheel of claim 1 wherein the flange portion of the disc further includes an annular rim of elastomeric material wherein the bearing surface is formed on the elastomeric material.

5. The wheel of claim 4 wherein the elastomeric material is polyethylene of high molecular weight.

* * * * *